May 4, 1937.  S. JENCICK  2,079,290

WHEEL SUSPENSION DEVICE FOR AUTOMOBILES

Filed Nov. 15, 1934  2 Sheets-Sheet 1

INVENTOR.
STEPHEN JENCICK.
BY Milburn and Milburn
ATTORNEYS.

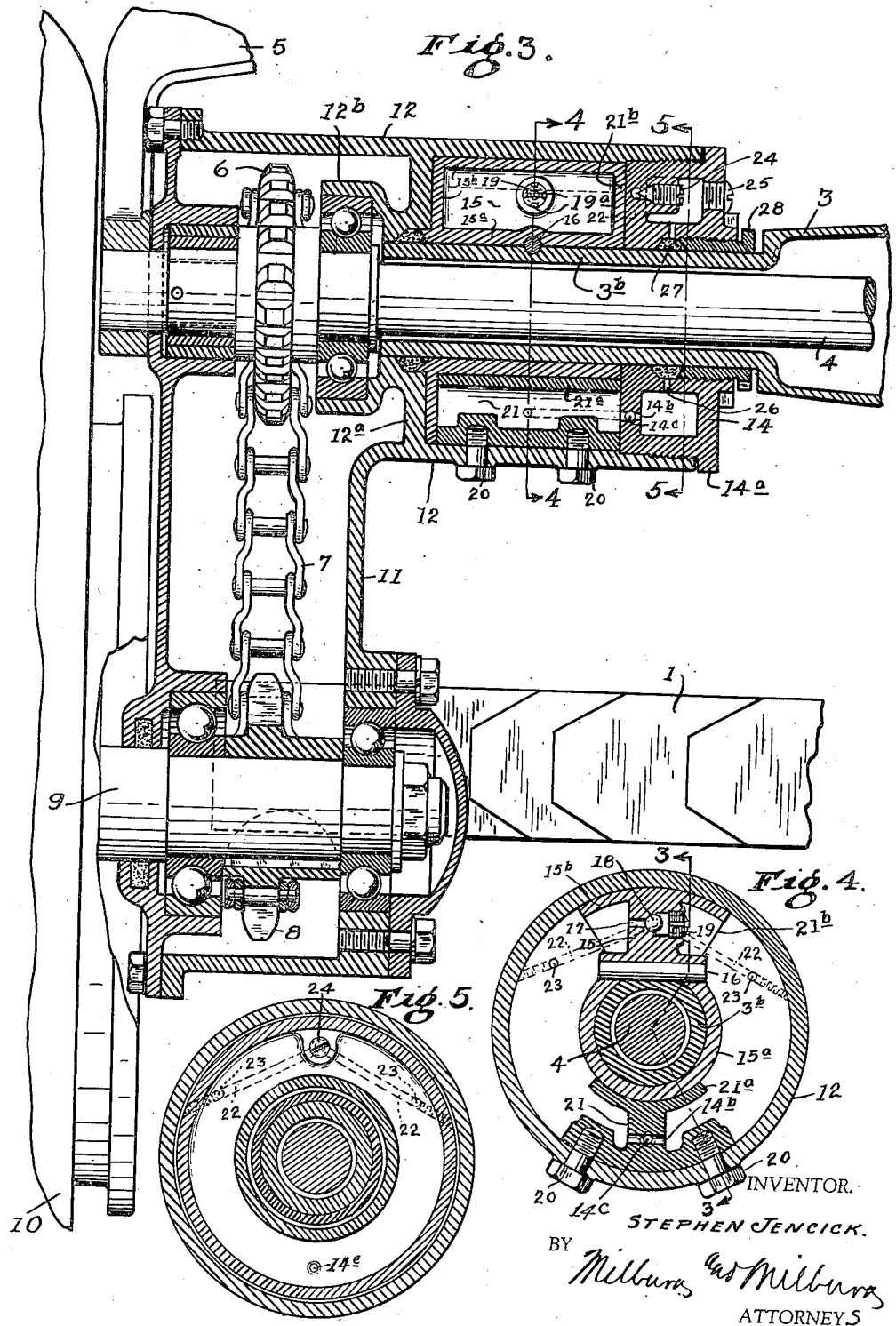

Patented May 4, 1937

2,079,290

UNITED STATES PATENT OFFICE 2,079,290

WHEEL-SUSPENSION DEVICE FOR AUTOMOBILES

Stephen Jencick, Chagrin Falls, Ohio, assignor to Thompson Products, Inc., Cleveland, Ohio, a corporation Application November 15, 1934, Serial No. 753,239

5 Claims. (Cl. 180—72)

This invention relates to the art of independently acting wheel-suspension devices for automobiles, and this application is closely related to a companion application executed of even date herewith.

The purpose of this invention is to provide such a device which is of comparatively simple structure and which at the same time is highly efficient and dependable and not apt to get out of order.

Another object is to devise an improved combination of such a device and a shock absorber means, in which there is a highly efficient and advantageous structural arrangement and co-ordination between the parts of this combination.

A further object is to devise such a combination of wheel-suspension means and shock-absorbing means that is comparatively inexpensive and that can therefore be adopted in the less costly automobiles.

Other objects will appear from the following description and claims when considered together with the accompanying drawings.

Figure 1:
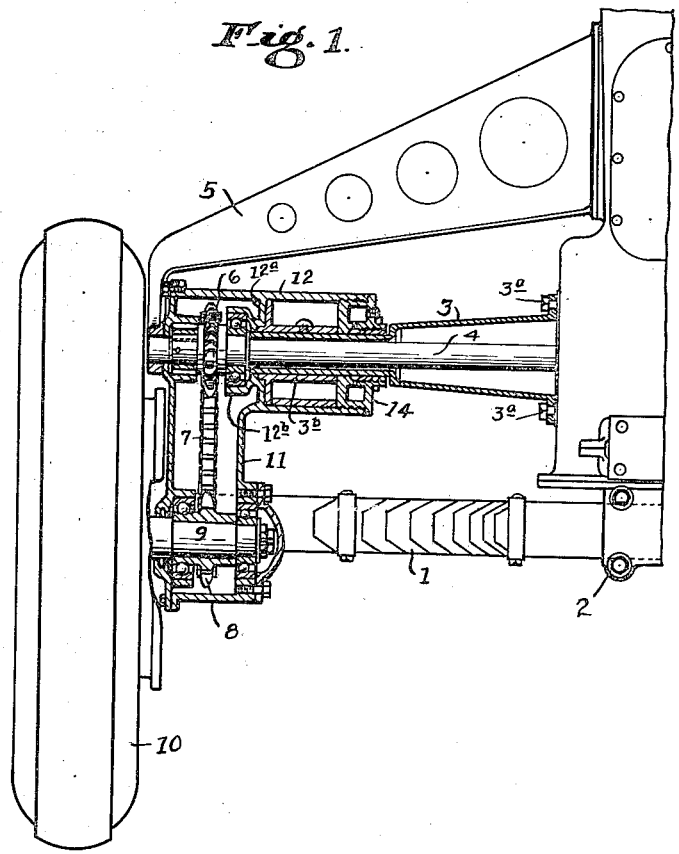
Fig. 1 is a view corresponding to line 1—1 of Fig. 2.
Figure 2:
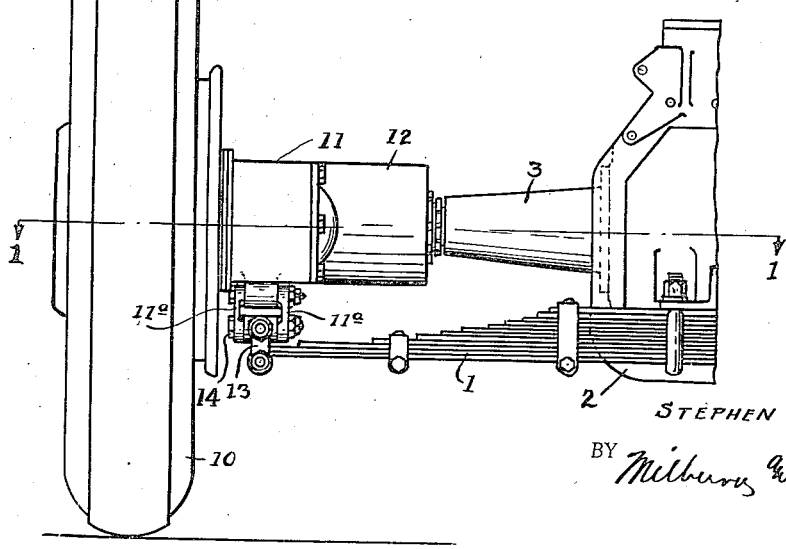
Fig. 2 is an end elevation of the same.

Fig. 3 is an enlarged sectional view of a part of Fig. 1, and corresponds to line 3—3 of Fig. 4; and Figs. 4 and 5 are sectional views corresponding to lines 4—4 and 5—5, respectively, of Fig. 3.

It is to be understood that the present disclosure is merely for purposes of illustration and that various other modifications may be made without departing from the spirit of the present invention as herein set forth and claimed.

In the present application, there is illustrated my invention adapted for use in connection with the rear wheels of an automobile, while in my companion application above referred to, I have illustrated a form of invention for use in connection with the front wheels of an automobile.

Referring to the accompanying drawings, it is to be understood that the same structure as herein illustrated is intended to be employed in connection with both of the rear wheels.

The same transversely disposed multiple leaf spring 1 is employed in connection with the devices for both rear wheels, the one end portion of this spring being utilized with the device for the one rear wheel, and the other end portion thereof being utilized with the device of the other rear wheel. This spring is mounted at the middle thereof upon the chassis 2 in the manner already familiar to those who are familiar with this art.

According to my invention, the automobile body is affixed directly to the chassis, as will be understood.

Fixedly secured to the rear end of the chassis by means of the bolts 3ª is the transversely extending hollow bracket 3, and a like bracket is provided upon the other side of the chassis, the same suspension means being provided for both rear wheels.

With the above understanding, the description of the one device, as herein illustrated, will apply also to the duplicate device provided for the other rear wheel.

The outer end portion of the bracket 3 is formed with a reduced portion 3ᵇ through which extends the axle 4. The end of axle 4 has bearing in the stationary bracket 5 which is mounted on the chassis. The sprocket wheel 6, which is fixed upon the axle 4, is adapted to drive the sprocket chain 7 which in turn drives the sprocket wheel 8 fixed on the stub shaft 9 of the wheel 10. The stub shaft 9 is mounted in suitable bearings in the end of the hollow arm 11 which houses the sprocket and chain drive connection and at its other end has an inwardly extending portion 12 mounted for oscillatable movement about the axis of the axle 4.

As herein illustrated, the arm 11 extends longitudinally of the automobile and the bracket 3 is offset longitudinally, that is, forwardly, with respect to the spring 1 and is located in a plane above that of the spring 1.

The free end of arm 11 has a multi-way pivotal connection which might be considered a substantially universal connection with the end of spring 1. This connection comprises the pair of links 13 which are pivotally connected at their lower ends to the spring 1 and at their upper ends have pivotal connection with respect to the companion joint members 14 of the links 11ª which in turn are pivotally connected to the end of the arm 11. Thus, the arm 11 has a multi-way pivotal connection with the end of spring 1, whereby there is obtained a co-ordination of the movements of the spring 1 and the arm 11. As will be readily understood, the end of spring 1 will describe a curved path of movement in a transverse plane while the curved path of movement of the end of arm 11 will be in a longitudinal plane with respect to the length of the automobile.

The laterally or inwardly extending part 12 of the oscillatable arm has an inwardly extending annular portion 12ª which engages the reduced portion 3ª of the bracket 3, and has also an axially extending portion 12ᵇ which has bearing engagement about the axle 4. The open inner end of the laterally extending cylindrical part 12 receives and is closed by the hollow, annular form of reservoir 14 which engages about the reduced portion 3ᵇ of the bracket 3. The reservoir 14 has an annular flange 14ª which has sealed engagement with the end of the cylindrical wall 12. This reservoir is for the oil of a hydraulic shock absorber, as will now more fully appear.

Within the annular space about the reduced portion 3ᵇ and extending between the annular wall 12ᵃ and the wall of the reservoir 14, there is the partition member 15 which has a co-axially disposed portion 15ᵃ surrounding and locked to the reduced portion 3ᵇ by means of the pin 16.

Through the partition member 15, there extends the passage 17 which is adapted to be closed by the ball valve 18. This ball 18 is maintained within its chamber by the slotted screw plug 19, the slots 19ᵃ permitting passage past the plug at all times regardless of the position of the ball 18. Any number of such slots may be provided in the edge of this plug.

The partition member 15 is also provided with a bearing portion 15ᵇ which engages the inner surface of the hollow, cylindrical portion 12 so as to form a bearing engagement therefor as it is oscillated about the axis of the axle 4.

Bolted to the inside of the wall 12, as indicated at 20, is the plunger 21 which has an inner curved bearing portion 21ᵃ engaging about the portion 15ᵃ about which it is adapted to be oscillated.

The inner wall of the reservoir 14 is formed with the passages 22 which connect at their outer ends through the openings 23 with the compression chambers upon the opposite sides of plunger 21. The oil will be permitted to pass through these openings and passages during a part of the movement of the plunger 21 in either direction, but in case of extreme movement, the openings 23 will be closed by the end portion 21ᵇ of the plunger so as to check further passage of the oil from one chamber to the other except for that permitted by leakage between the parts. The form of the end portion 21ᵇ will be determined by the consideration as to when the openings 23 should be closed.

The screw-threaded needle valve 24 is provided to regulate the amount of flow permitted through the passages 22, this valve being accessible for adjustment by removing the plug 25 which may also be removed for replenishing or changing the oil in the reservoir.

The oil will be fed automatically as required from the reservoir 14 through the passage 14ᵇ and into the chamber of the shock absorber. This passage is controlled by the one-way ball valve 14ᶜ.

The ducts 26 are for automatically feeding oil from the reservoir to the portion 3ᵇ for lubricating the packing 27 for which the threaded member 28 is provided.

From the above, it will be seen that when a rear wheel encounters a depression, the arm 11 will turn down about the axis of its mounting while spring 1 bends downwardly. During this action, the links 11ᵃ and 13 will turn about their pivot points so as to permit the wheel to move along a straight line. That is, by virtue of this multi-way connection, the wheel will move up and down only in a substantially vertical plane as it encounters uneven places in the roadway, and without appreciable movement of the wheel either forward or rearward.

The links 11ᵃ permit the wheel to remain in the same relative position, forwardly or rearwardly with respect to the body of the automobile, in spite of the fact that the rear end of the arm describes a curved path above and below the horizontal as the arm 11 is moved up and down about the axis of its shaft 4.

The links 13 permit the wheel to remain at all times in a vertical plane in spite of the curved path described by the outer end of the spring 1. This is true whether the wheel encounters a depressed or raised portion in the roadway, that is, whether the end of the spring turns downwardly or upwardly. Such downward movement of the end of the spring will be caused, for instance, by a depression in the roadway, while the spring end will be caused to turn upwardly by the rebound action or by encountering a raised portion in the roadway.

Obviously, each wheel will act in the same manner and independently of the action of the other wheel at any given time.

During such downward movement of the wheel, as above described, the plunger 21 will be moved clockwise, as viewed in Fig. 4, and the oil will pass through the opening 17 and also through the passages 22, except in case the movement should be so severe as to finally close the corresponding opening 23, as above explained. This closing of the passages 22 results practically in a lock except for the escape of oil between the parts, and thus the severe shock from an extremely deep depression is prevented.

Then upon rebound or when the wheel encounters a raised portion in the road, the arm 11 will turn in the opposite direction, that is, upwardly, about the axis of its shaft and the spring 1 will also bend upwardly and the plunger 21 will turn in the opposite direction, that is, counter-clockwise as viewed in Fig. 4. Such movement of the plunger 21 causes the valve 18 to close and the passages 22 alone are open. Thus, during rebound, there is more checking of the movement of the arm 11 and if such movement should be sufficiently severe and prolonged, there will be effected a substantial lock by closing the corresponding opening 23, in the same manner, as above explained.

Whether the arm 11 be turned downwardly or upwardly, the links 11ᵃ and 13 will function in the same way to prevent the bending of the spring and the turning of the arm 11 from interfering with the maintenance of the wheel in a vertical plane of up and down movement.

The sprocket and chain combination affords a flexible drive connection which will permit the individual action of the rear wheels in the manner above explained, without interfering with and without any interference by the transmission of power to the rear wheels. The sprocket and chain combination is simple in its nature and does not involve any radical modification of the drive connection through the rear axles. Thus, this particular combination is peculiarly well adapted for this particular purpose and is the means of rendering practical what has heretofore been considered impractical, namely, the individual suspension of the rear or driven wheels of an automobile.

Furthermore, the sprocket and chain connection is enclosed within the housing afforded by the hollow, oscillatable arm and the lateral extension of this arm by which the same is mounted affords a suitable and efficient housing for the hydraulic shock absorber which is thereby arranged in an effective manner with relation to the wheel-suspension means, as herein explained.

Thus, I have devised an improved and simplified form of suspension means for the rear or driven wheels of an automobile, and I have also produced a direct and efficient co-ordination between the action of the wheel-suspension means and the shock-absorbing means. That is, in my combination, the shock-absorber not only serves as such but it also serves to govern the action of the wheel-suspension means throughout all its phases of operation. Instead of checking the downward and upward movements of the automobile body, the action of the spring is checked and controlled in the first instance without an opportunity to be transmitted to the body of the automobile. In this way, there is precluded any tendency towards unnecessary or extreme movement of the automobile body, and this applies to both of the rear wheels in their individual movements. Thus, there is precluded any undesirable excess freedom of movement and there is eliminated the objectionable "galloping" action which is characteristic of certain modern, popular types of automobiles in which the wheels are independently sprung, and which indicates an uncontrolled freedom of spring action. Consequently, with my improved combination, there is obtained smoother riding condition of the automobile body under any and all road conditions.

Another advantage consists in the simplicity of structure throughout the entire device, which factor means a comparatively low cost of manufacture and its availability for adoption upon the low priced automobiles.

What I claim is:

1. In an automobile, the combination of a chassis, a laterally extending bracket affixed thereto, spring means supported upon said chassis and offset from said bracket in a direction lengthwise of the automobile, a hollow lever arm upon which a wheel is carried, said arm being mounted about the outside of said bracket for oscillating movement thereabout in a vertical plane and having substantially universal connection with said spring means, said bracket being hollow and housing a transversely extending, concentrically arranged drive shaft, means housed within said hollow arm for operatively connecting the transverse drive shaft with the wheel for driving the same, and an auxiliary stationary arm mounted upon the chassis and having a bearing for the outer end of the transversely extending drive shaft.

2. In an automobile, the combination of a chassis, a laterally extending bracket affixed thereto, a multiple leaf spring supported upon said chassis and offset from said bracket in a direction lengthwise of the automobile, a rear driving axle, a hollow lever arm upon one end of which a rear drive wheel is carried, said arm at its other end having a lateral projection mounted upon the outside of said bracket for oscillating movement thereabout so that the longitudinally extending arm will move in a vertical plane, said arm having substantially universal connection with said spring at that end of the arm upon which the rear wheel is mounted so as to co-ordinate the movements of the arm and spring, the lateral projection of said arm being concentrically arranged with respect to the rear driving axle so as to co-operate with said bracket in housing the rear axle, means housed also within said hollow arm for operatively connecting the rear driving axle with the wheel for driving the same, and an oscillatable shock absorber of which the oscillatable connection between said arm and bracket forms a part, arranged concentrically between the lateral projection of said arm and said bracket.

3. In an automobile, the combination of a chassis, a laterally extending bracket affixed thereto, spring means supported upon said chassis and offset from said bracket in a direction lengthwise of the automobile, a lever arm upon which a wheel is carried, said arm being mounted upon the outside of said bracket for oscillating movement thereabout in a vertical plane and having substantially universal connection with said spring means so as to co-ordinate the movements of the arm and spring means, and an oscillatable hydraulic shock absorber of which the oscillatable connection between said arm and bracket forms a part, arranged concentrically between the lateral projection of said arm and said bracket, said shock absorber comprising a radial partition fixedly mounted upon said bracket and forming separate compartments within the lateral projection of said arm, and a radially disposed plunger mounted upon the inside of the lateral projection of said arm, and said compartments having means of communication therebetween for the passage of the fluid of the shock absorber.

4. In an automobile, the combination of a chassis, a laterally extending bracket affixed thereto, spring means supported upon said chassis and offset from said bracket in a direction lengthwise of the automobile, a lever arm upon which a wheel is carried, said arm being mounted upon the outside of said bracket for oscillating movement thereabout in a vertical plane and having substantially universal connection with said spring means so as to co-ordinate the movements of the arm and spring means, and an oscillatable hydraulic shock absorber of which the oscillatable connection between said arm and bracket forms a part, arranged concentrically between the lateral projection of said arm and said bracket, said shock absorber comprising a radial partition fixedly mounted upon said bracket and forming separate compartments within the lateral projection of said arm, and a radially disposed plunger mounted upon the inside of the lateral projection of said arm, said compartments having means of communication therebetween for the fluid of the shock absorber, and an annular form of reservoir surrounding said bracket at the inner end of the shock absorber, said reservoir having means of communication with the interior of said shock absorber for replenishing the supply of fluid thereto.

5. In an automobile, the combination of a chassis, a laterally extending bracket affixed thereto, spring means supported upon said chassis and offset from said bracket in a direction lengthwise of the automobile, a lever arm upon which a wheel is carried, said arm being mounted at one end thereof upon the outside of said bracket for oscillating movement thereabout in a vertical plane and having substantially universal connection at the other end thereof with said spring means so as to co-ordinate their movements, and an oscillatable shock absorber of which the oscillatable connection between said arm and bracket forms a part, arranged concentrically with respect to said bracket.

STEPHEN JENCICK.